(12) United States Patent
Tezuka et al.

(10) Patent No.: US 9,651,939 B2
(45) Date of Patent: May 16, 2017

(54) NUMERICAL CONTROLLER HAVING DISPLAY FUNCTION OF PHYSICAL DATA OF MACHINE TOOL

(75) Inventors: Junichi Tezuka, Yamanashi (JP); Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1160 days.

(21) Appl. No.: 13/608,111

(22) Filed: Sep. 10, 2012

(65) Prior Publication Data

US 2013/0096700 A1    Apr. 18, 2013

(30) Foreign Application Priority Data

Oct. 13, 2011    (JP) .................................. 2011-225982

(51) Int. Cl.
G05B 15/00    (2006.01)
G05B 19/4068    (2006.01)
G05B 19/408    (2006.01)

(52) U.S. Cl.
CPC ....... *G05B 19/4068* (2013.01); *G05B 19/408* (2013.01)

(58) Field of Classification Search
None
See application file for complete search history.

(56) References Cited

FOREIGN PATENT DOCUMENTS

| EP | 0663257 A2 | 7/1995 |
|---|---|---|
| JP | 7-204942 A | 8/1995 |
| JP | 2003-075472 A | 3/2003 |
| JP | 2004-216715 A | 8/2004 |

OTHER PUBLICATIONS

Nojedeh et al., "Tool path accuracy enhancement through geometrical error compensation", Available online Feb. 24, 2011, Elsevier.*
Office Action corresponding to JP 2011-225982, dated Jan. 15, 2013.

* cited by examiner

*Primary Examiner* — Carlos Ortiz Rodriguez
(74) *Attorney, Agent, or Firm* — Hauptman Ham, LLP (57) ABSTRACT

A numerical controller having a display function for comparing data at a predetermined position regardless of a change in a processing condition. The numerical controller comprises a numerical controlling part which controls each drive axis based on a predetermined position command; a position data obtaining part which obtains position data of each axis and a tool representative point of the machine tool; a movement distance calculating part which calculates movement distance of the axis and the tool representative point based on the obtained position data and dimensional information of each component of the machine tool; a physical data obtaining part which obtains physical data of each axis and the tool; a data converting part which converts the obtained time axis-based physical data into movement distance-based data; a distance-based data storing part which stores the movement distance-based data; and a displaying part which displays the movement distance-based data.

7 Claims, 10 Drawing Sheets

NUMERICAL CONTROLLER HAVING DISPLAY FUNCTION OF PHYSICAL DATA OF MACHINE TOOL

RELATED APPLICATIONS

The present application claims priority from, Japanese Application Number 2011-225982, filed Oct. 13, 2011, the disclosure of which is hereby incorporated by reference herein in its entirety.

BACKGROUND OF THE INVENTION

1. Field of the Invention

The present invention relates to a numerical controller having a function for displaying physical data of a machine tool, such as a speed of a drive axis and a representative point of a tool, with reference to movement distance of the drive axis and the tool.

2. Description of the Related Art

In a machine tool, the same processing program may be carried out based on different processing conditions, such as processing speed. When it is necessary to adjust the machine tool in such a case, it is important to compare data after the adjustment to past data before the adjustment. Therefore, a waveform display device has been proposed, wherein sets of time-series data, such as speed of a drive axis or a tool tip point obtained from a numerical controller, are overlapped with each other and displayed. For example, Japanese Unexamined Patent Publication (Kokai) No. 2003-75472 discloses a technique for displaying two servo waveforms based on servo information from a controller, wherein the two waveforms are overlapped with each other within a single display frame.

Further, Japanese Unexamined Patent Publication (Kokai) No. 2004-216715 discloses a technique for displaying a three-dimensional graph of changed cycle patterns on a monitor device of an injection machine, wherein first, second and third axes represent time, a variable such as injection pressure, and a forming cycle, respectively.

When the processing speed is changed, processing time is also changed accordingly, even if the shape of a commanded trajectory is not changed. Therefore, in relation to a plurality of different processing conditions, when physical information such as the speed of the tool tip point is compared as time-series data, it is difficult to compare the data at the same processing position. For example, although Japanese Unexamined Patent Publication (Kokai) No. 2003-75472 discloses the overlapping of time axis-based data, it does not disclose the overlapping of movement distance-based data, which does not depend on the time axis. On the other hand, the invention of Japanese Unexamined Patent Publication (Kokai) No. 2004-216715 is intended to overlap the changed pattern of each cycle while representing the forming cycle on the third axis, however, the time-series data is compared while representing the time on the horizontal axis, and thus the data is not compared with reference to the movement distance.

SUMMARY OF THE INVENTION

An object of the present invention is to provide a numerical controller having a display function for comparing physical information data of a machine tool with reference to a movement distance, even when a processing condition such as a processing speed is changed.

According to the present invention, a numerical controller is provided, comprising: a numerical controlling part which controls at least one drive axis of a machine tool; a position data obtaining part which obtains position data of the drive axis and a representative point of a tool of the machine tool; a physical data obtaining part which obtains physical data of the drive axis and the representative point of the tool; a movement distance calculating part which calculates movement distance of the drive axis and the representative point of the tool based on the position data; a data converting part which converts the physical data obtained by the physical data obtaining part, which is time axis-based data, into movement distance-based data; a distance-based data storing part which stores the movement distance-based data; and a displaying part which displays the movement distance-based data, wherein the displaying part displays at least one past movement distance-based data, which is stored in the distance-based data storing part, on the movement distance-based data displayed on the displaying part so that the displayed movement distance-based data are overlapped with each other.

In a preferred embodiment, the movement distance calculating part adjusts the movement distance of the movement distance-based data corresponding to a movement distance of a reference movement distance-based data, and the displaying part displays the movement distance-based data based on the adjusted movement distance.

In this case, the movement distance calculating part may divide a movement distance of the representative point of the tool in a reference processing condition into a plurality of segments, and may adjust the movement distance of corresponding segment in a processing condition different from the reference processing condition, corresponding to the movement distance of the plurality of segments, and the displaying part may display the movement distance-based data based on the adjusted movement distance.

Further, the movement distance calculating part may divide the movement distance of the representative point of the tool in the reference processing condition into a plurality of segments, at a point corresponding to a start point of each block of a plurality of program blocks included in a processing program.

Otherwise, the movement distance calculating part may calculate a curvature of the trajectory of the drive axis and the representative point of the tool, and may divide the movement distance of the representative point of the tool in the reference processing condition into a plurality of segments at a point where the curvature is maximum or minimum.

In addition, the movement distance calculating part may calculate movement distance of the drive axis and the representative point of the tool based on information of a position command obtained from the numerical controlling part.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
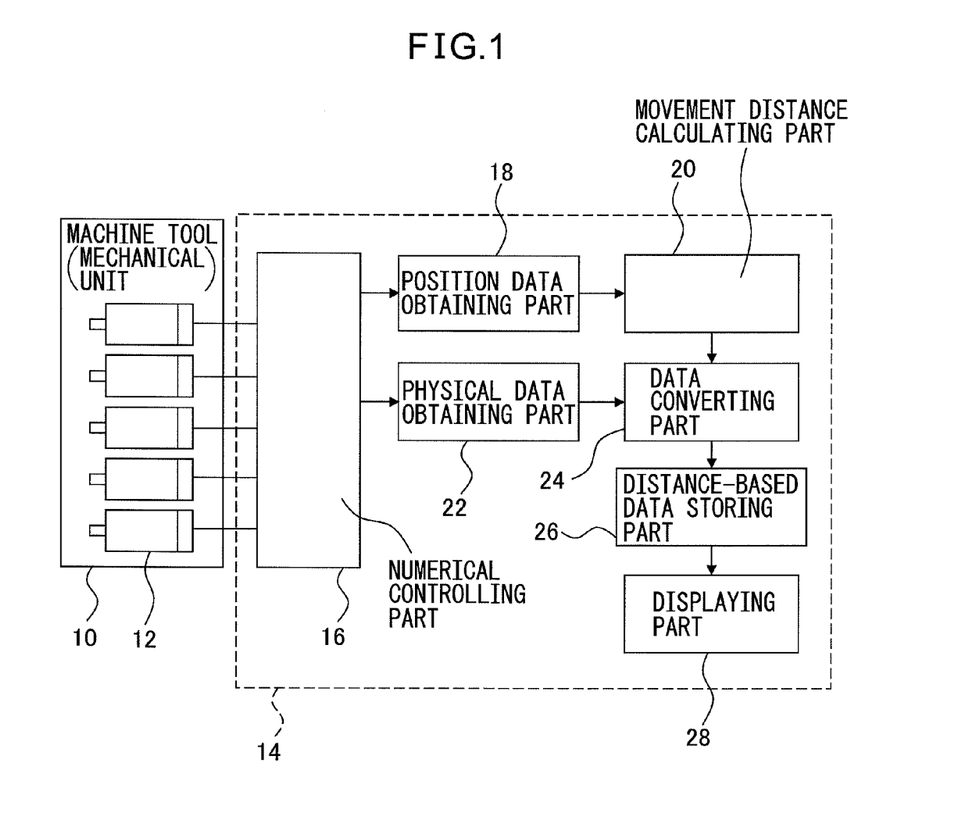
FIG. 1 is a block diagram showing a schematic configuration of a numerical controller according to an embodiment of the present invention.

FIG. 1 shows an example of a system configuration, including a numerical controller according to the present invention, having a displaying function of physical data of a machine tool. A machine tool (mechanical unit) 10 has at least one (five in the illustrated embodiment) drive axis 12 such as a servomotor, and each drive axis 12 is controlled by a numerical controller (CNC) 14. Numerical controller 14 has a numerical controlling part 16 which controls each drive axis 12 based on a predetermined position command, a position data obtaining part 18 which obtains position data of each drive axis 12 controlled by numerical controlling part 16 and a representative point (for example, a tool center point) of a tool of the machine tool, and a movement distance calculating part 20 which calculates a movement distance of each drive axis and the representative point of the tool, based on the obtained position data and information (such as dimensions) of each component of the mechanical configuration of machine tool 10. Numerical controller 14 further has a physical data obtaining part 22 which obtains physical data of each axis 12 and the tool of machine tool 10; a data converting part 24 which converts the obtained time axis-based physical data into movement distance-based data by using the movement distance calculated by movement distance calculating part 20; a distance-based data storing part 26 which stores the movement distance-based data; and a displaying part 28 or a display unit such as a monitor which displays the stored movement distance-based data. The physical data of each axis 12 may include, for example, a current value, a voltage value and/or a torque of an electric motor or servomotor for driving each axis, and the physical data of the tool may include, for example, a position, speed and/or acceleration of the tool representative point.

Next, an example of the procedure of the numerical controller of the invention will be explained with reference to a flowchart of FIG. 2 and graphs of FIGS. 3 to 5. Movement distance D(t) of each axis and the tool representative point (such as a tool center point) is obtained by integrating absolute value |V(t)| of the speed in relation to time t, i.e., represented by following equation (1), wherein a start-up time point of the processing is equal to zero (t=0) (step S1).

$$D(t) = \int_0^t |V(t)| dt \qquad (1)$$

Figure 3:
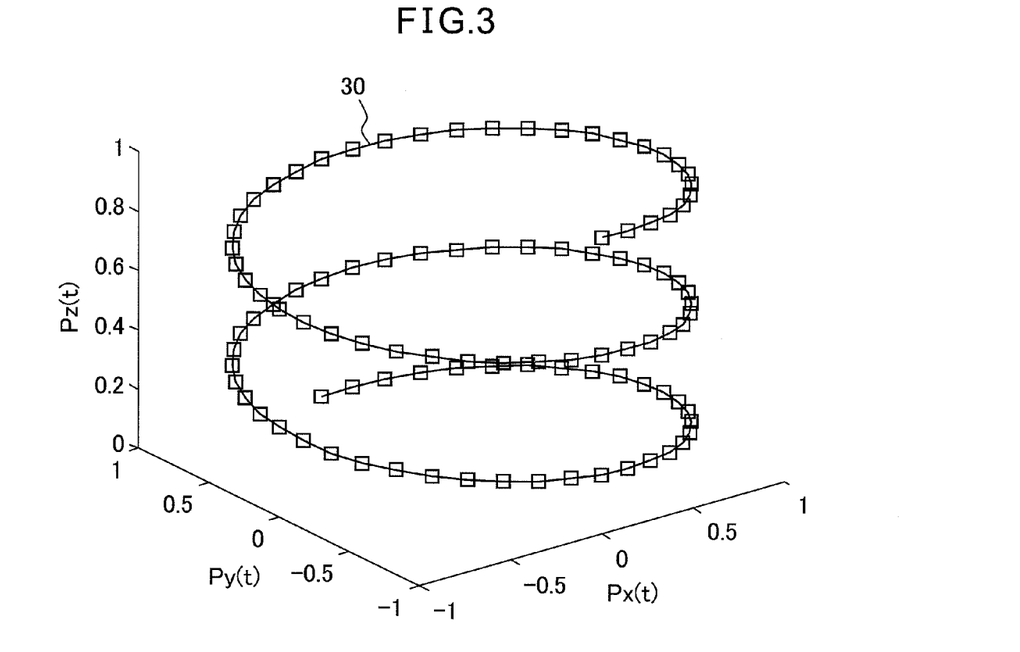
FIG. 3 is a graph showing a three-dimensional movement trajectory of a representative point of a tool of a machine tool.

In this case, the tool representative point is moved along a spiral trajectory 30 as show in FIG. 3, for example, as in a threading processing. In this regard, FIG. 4 shows changes in the movement distance and the speed of the tool representative point, with reference to time t after starting the processing, when the processing is carried out in different two processing conditions wherein commanded trajectories of the conditions are the same and processing speeds of the conditions are different. Concretely, a graph 32 indicates the movement distance in a first processing condition, a graph 34 indicates the movement speed in the first processing condition, a graph 36 indicates the movement distance in a second processing condition, and a graph 38 indicates the movement speed in the second processing condition. As shown in FIG. 4, the processing time in the first condition is about two times larger than the processing time in the second condition.

Figure 4:
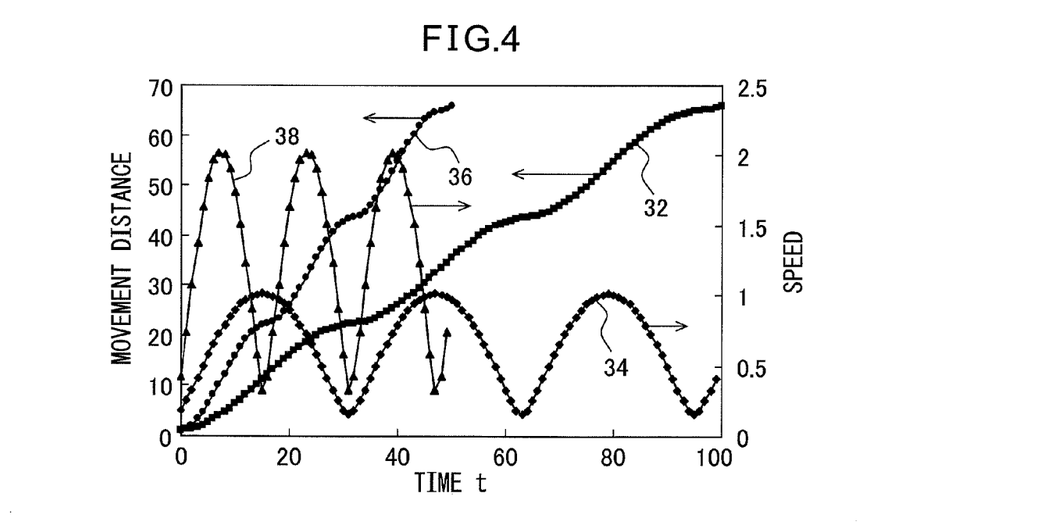
FIG. 4 is a graph showing a movement distance and a speed of the representative point of the tool in different two processing conditions with reference to a time axis.
Figure 5:
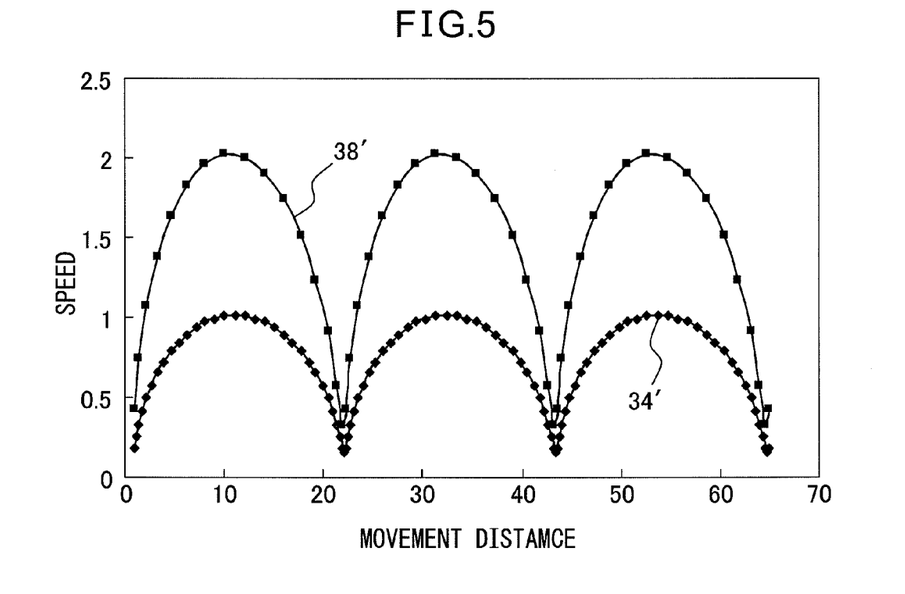
FIG. 5 is a graph showing the speed of the representative point of the tool in the processing conditions of FIG. 4 with reference to a movement distance.

When the physical data such as the speed is displayed on the graph with reference to the time axis, as shown in FIG. 4, it is possible to compare the speeds in the different conditions at the same time point. However, since the processing time (or the processing speed) is different in the two processing conditions, it is impossible to compare the speeds in the different conditions at the same processing position. Therefore, by converting time axis-based graphs 34 and 38 into tool movement distance-based graphs 34' and 38'

(see FIG. 5), respectively, as described below, it is possible to compare the physical data such as the speeds in the different conditions at the same processing position.

Figure 2:
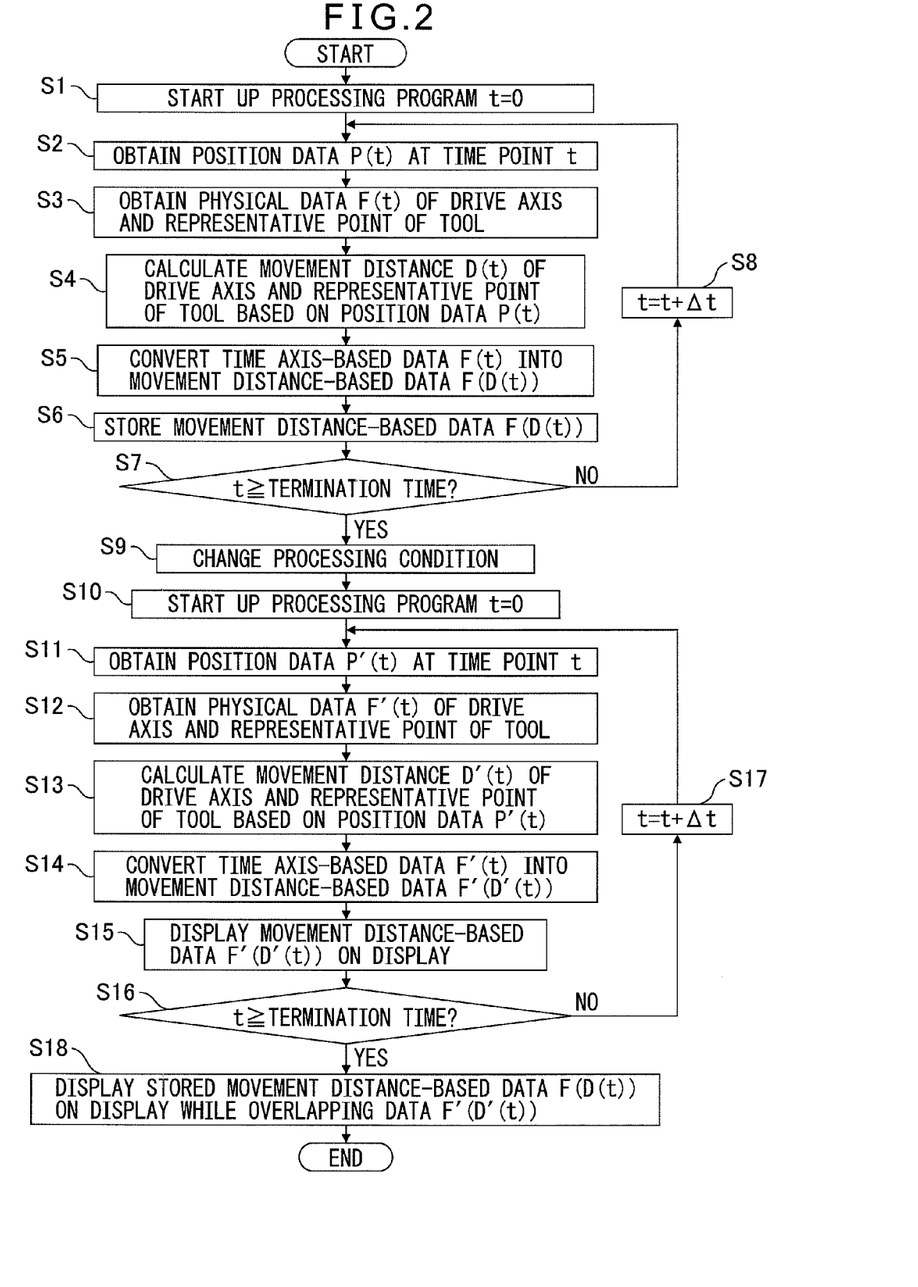
FIG. 2 shows a flowchart indicating one example of the procedure of the numerical controller.

As shown in FIG. 2, in step S2, position data P(t) of the tool representative point at time point t is obtained under the first processing condition. Next, in step S3, physical data F(t) of the drive axis and the tool representative point is obtained. In the next step S4, integrated movement distance D(t) of the drive axis and the tool representative point is calculated based on position data P(t) obtained in step S2. Then, in the next step S5, time axis-based physical data F(t) obtained in step S3 is converted into movement distance-based physical data F(D(t)), by using calculated movement distance D(t). In the next step S6, obtained movement distance-based physical data F(D(t)) is stored in distance-based data storing part 26.

In the next step S7, it is judged whether the processing in the first processing condition is complete or not. If not, the procedure progresses to step S8, and steps S2 to S6 are repeated. When the processing in the first processing condition is completed, the processing condition is changed to the second processing condition (step S9), and the procedure similar to steps S1 to S7 is carried out.

Concretely, the start-up time point of the processing is set to zero (t=0) (step S10). Then, in step S11, position data P'(t) of the tool representative point at time point t is obtained under the second processing condition, and then, in step S12, physical data F'(t) of the drive axis and the tool representative point is obtained. In the next step S13, integrated movement distance D'(t) of the drive axis and the tool representative point is calculated based on position data P'(t) obtained in step S11. Then, in the next step S14, time axis-based physical data F'(t) obtained in step S12 is converted into movement distance-based physical data F'(D'(t)), by using calculated movement distance D'(t). In the next step S15, obtained movement distance-based physical data F'(D' (t)) is displayed on displaying part 28. In addition, movement distance-based physical data F(D(t)) may be stored in distance-based data storing part 26.

In the next step S16, it is judged whether the processing in the second processing condition is complete or not. If not, the procedure progresses to step S17, and steps S11 to S15 are repeated. Finally, in step S18, movement distance-based data F(D(t)) in the first processing condition, which is stored in distance-based data storing part 26, is displayed on displaying part 28, so that movement distance-based data F(D(t)) is overlapped with movement distance-based data F'(D'(t)) in the second processing condition at the same coordinate system. An example of the graph obtained as such is shown in FIG. 5.

Figure 6:
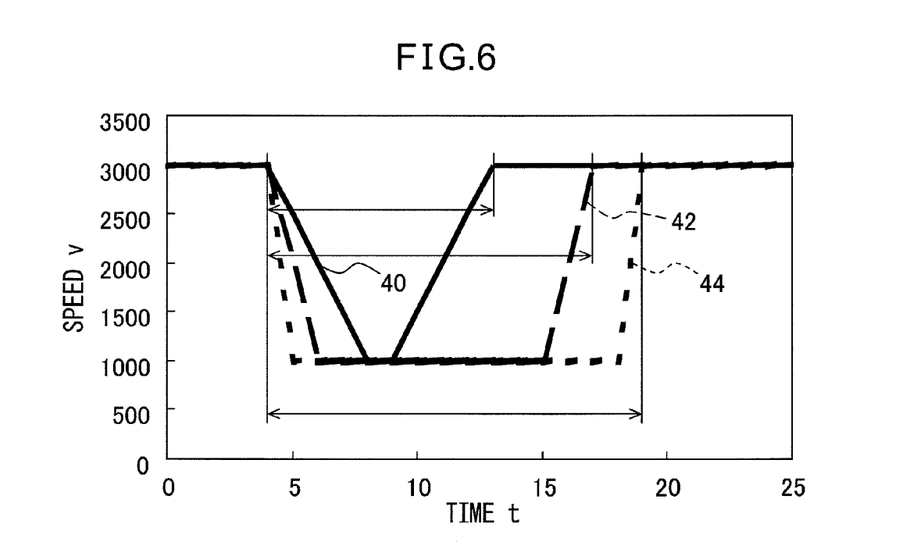
FIG. 6 is a graph showing a movement distance and a speed of the representative point of the tool in different three processing conditions with reference to a time axis.
Figure 7:
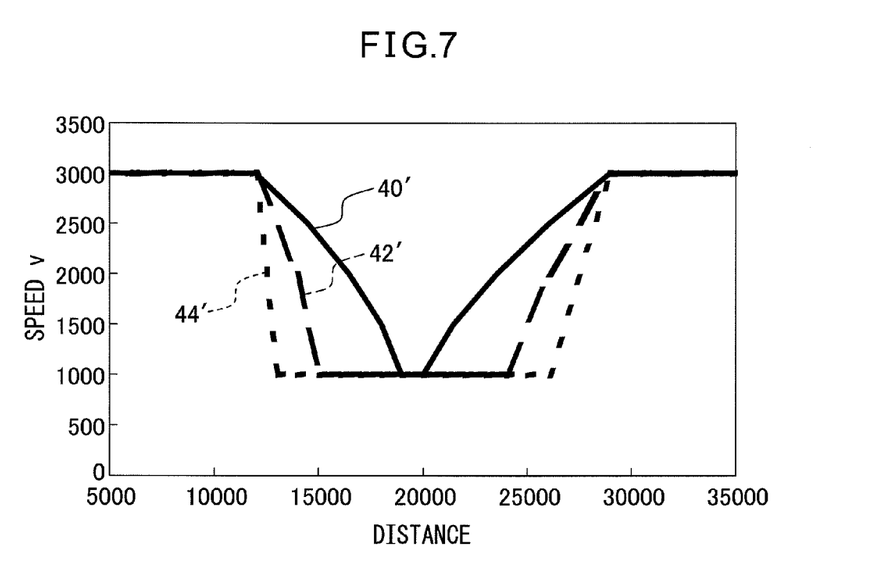
FIG. 7 is a graph showing the speed of the representative point of the tool in the processing conditions of FIG. 6 with reference to a movement distance.

When the commanded trajectory of the processing program includes a corner section, the tool is usually controlled so as to decelerate at the corner section. In this regard, when the object to be processed has a complicated shape, the control of acceleration/deceleration of the tool is also complicated. Therefore, as shown in FIG. 6, when a time-series data indicated by a graph 40 is obtained by performing certain processing condition, and another time-series data indicated by a graph 42 or 44 is obtained by performing changed processing condition, it is difficult to identify physical data corresponding to the processing position before the change based on the time-series data after the change. However, due to the procedure as shown in FIG. 2, time axis-based graphs 40, 42 and 44, wherein a terminal point of the corner section of each graph is different from each other, are converted into movement distance-based graphs 40', 42' and 44', respectively, as shown in FIG. 7, whereby the physical data (the movement speed of the tool in the embodiment) corresponding to each processing position may be easily compared.

Next, the adjustment of the movement distance between the different processing conditions will be explained. When a plurality sets of data in the same processing program should be compared after converting the data into movement distance-based data, it may be necessary to equalize the movement distance of each set of data. However, when there is a difference of the movement distance between each set of data, it is difficult to compare data since points corresponding to data to be compared are offset from each other. Therefore, by adjusting (enlarging or reducing) the movement distance from the processing start point to the processing terminal point of the data to be compared, corresponding to a movement distance of reference data, the above problem can be solved.

Figure 8:
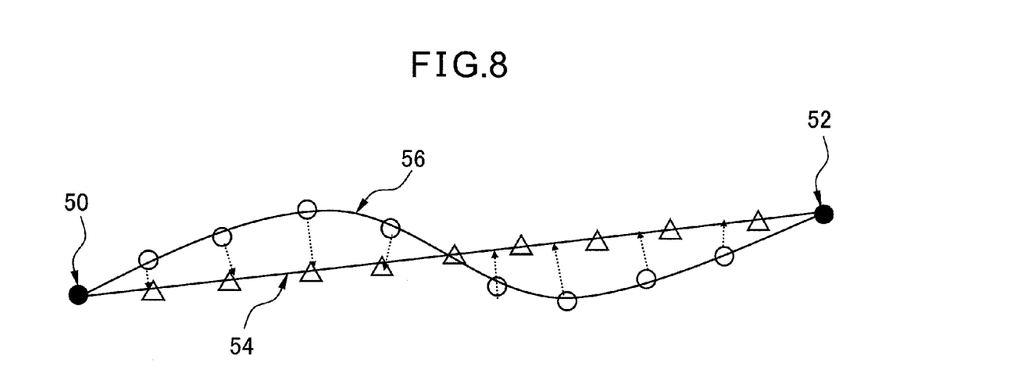
FIG. 8 is a diagram schematically showing movement trajectories of the representative point of the tool in different two processing conditions.
Figure 9:
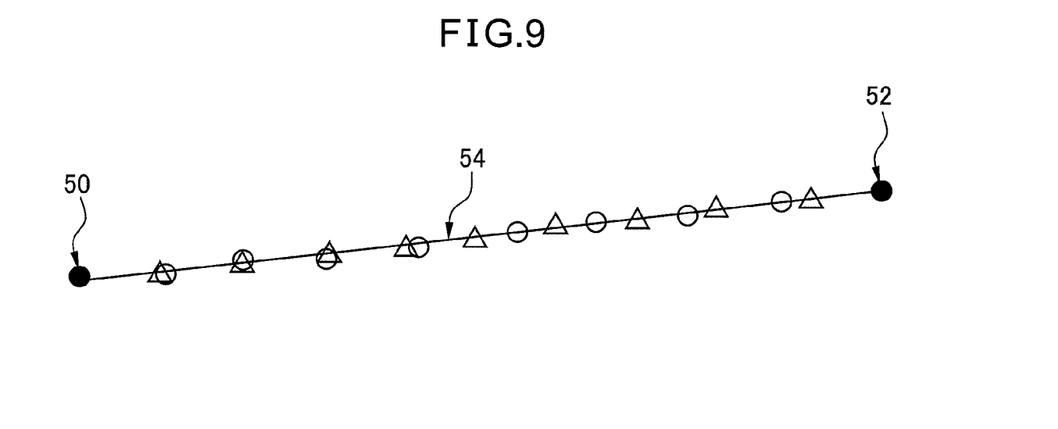
FIG. 9 is a schematic diagram wherein one of the trajectories is adjusted by using the movement distance of the other trajectory in the processing conditions of FIG. 8.

For example, as shown in FIG. 8, by performing processing in a certain processing condition, a generally straight movement trajectory 54 of the tool representative point, from processing start point 50 to a processing terminal point 52, is obtained, and the movement distance thereof (i.e., the length of movement trajectory 54) is taken as D1. Next, by performing processing after the certain processing condition is changed, a curved movement trajectory 56 of the tool representative point, from processing start point 50 to a processing terminal point 52, is obtained, and the movement distance thereof (i.e., the length of movement trajectory 56) is taken as D2. In such a case, when the time series data obtained by each processing condition is converted into movement distance-based data, the processing point, where the physical data is to be compared, is offset. Therefore, in the calculating process of the movement distance, due to the adjustment wherein movement distance D2 in the latter processing condition is multiplied by (D1/D2), each point on movement trajectory 56 can be represented as if each point is projected onto movement trajectory 54, as shown in FIG. 9, whereby the comparison of the physical data becomes easier.

Figure 10:
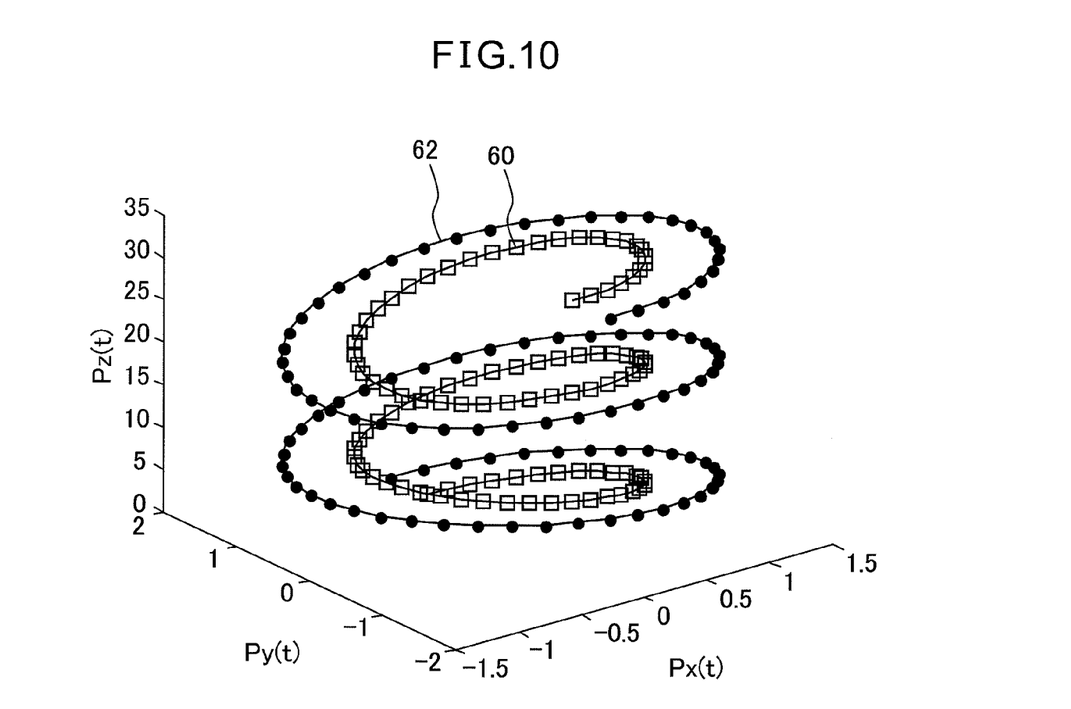
FIG. 10 is a graph showing three-dimensional movement trajectories of the representative point of the tool in different two processing conditions.
Figure 11:
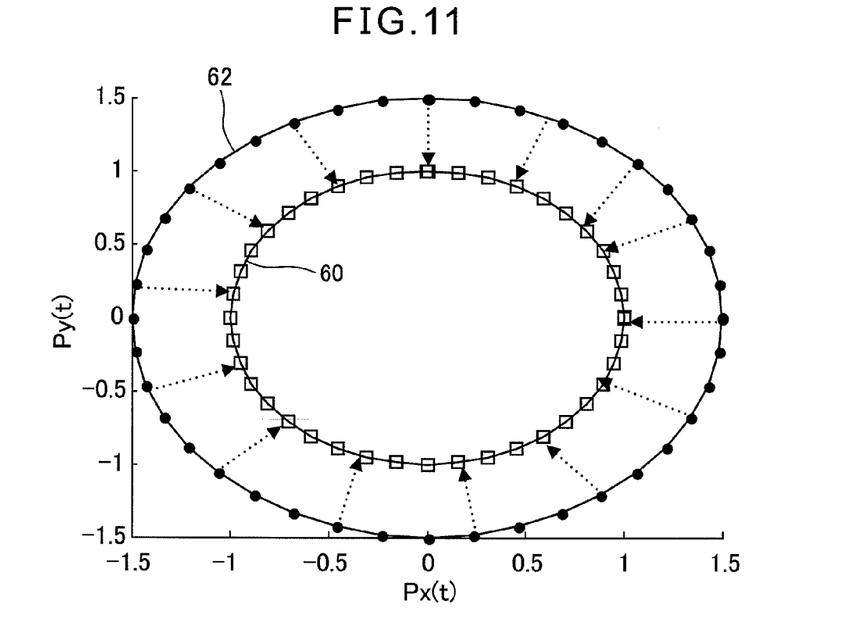
FIG. 11 is a graph wherein the movement trajectories of FIG. 10 are projected onto an X-Y plane, and one of the trajectories is adjusted by using the movement distance of the other trajectory.

In another example, as shown in FIG. 10, two movement trajectories 60 and 62, having different movement distances, are obtained by two different processing conditions. FIG. 11 is a diagram wherein the trajectories of FIG. 10 are projected onto the X-Y plane. When trajectory 60 is taken as a reference trajectory and the lengths of trajectories 60 and 62 of the tool representative point are represented by $D1(t)$ and $D2(t)$, respectively, by multiplying the movement distance of trajectory 62 by $(D1(t)/D2(t))$, each point on trajectory 62 can be represented as if each point is projected onto trajectory 60, as shown in FIG. 11, whereby the comparison of the physical data becomes easier.

Figure 12:
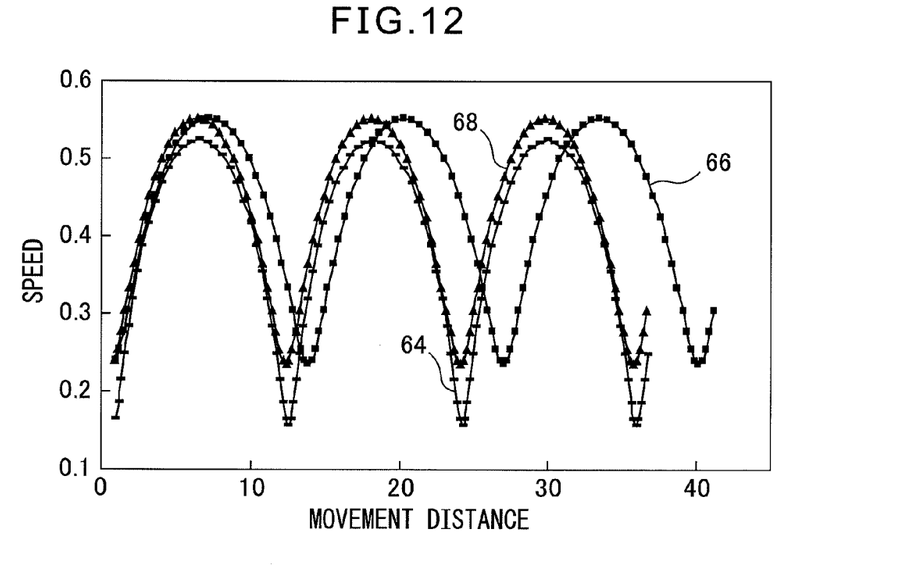
FIG. 12 is a graph wherein the moving speed of the representative point of the tool in the processing conditions of FIG. 10 is adjusted by using the movement distance and displayed on the same coordinate system.

Further, FIG. 12 shows a graph 64 of the distance-based speed of the tool representative point in trajectory 60, a graph 66 of the distance-based speed of the tool representative point in trajectory 62, and a graph 68 of the distance-based speed of the tool representative point in trajectory 62 after the distance adjustment wherein the movement distance of the tool representative point in trajectory 62 is multiplied by $(D1(t)/D2(t))$. As shown in FIG. 12, by reducing the movement distance of trajectory 62 corresponding to the movement distance of trajectory 60, trajectory 62 can be displayed and overlapped with trajectory 60 while the movement distances thereof are the same (graphs 64 and 68), whereby the comparison of the physical data at the same position becomes easier.

As described above, in the adjustment of the distance from the processing start point to the terminal point, corresponding to the movement distance of the reference data, when the movement distance is relatively long or the shape of the movement trajectory is complicated, it may be difficult to overlap the data at the predetermined processing point. Therefore, in the calculating process of the movement distance, it is effective to divide the trajectory of the drive axis and the tool representative point in a reference processing condition into a plurality of sections, and adjust the movement distance by calculating the length of the trajectory in the both processing condition in relation to each of the plurality of sections. Concretely, at least one characteristic point is selected from points on the movement trajectory in the reference processing condition, a movement distance between the characteristic point and the processing start point, a movement distance between the characteristic point and the processing terminal point, and/or a movement distance between the characteristic points, is calculated. Then, the movement distance of the different processing condition is enlarged or reduced corresponding to the movement distance of the reference processing condition, whereby the data can be overlapped with each other with high accuracy.

Figure 13:
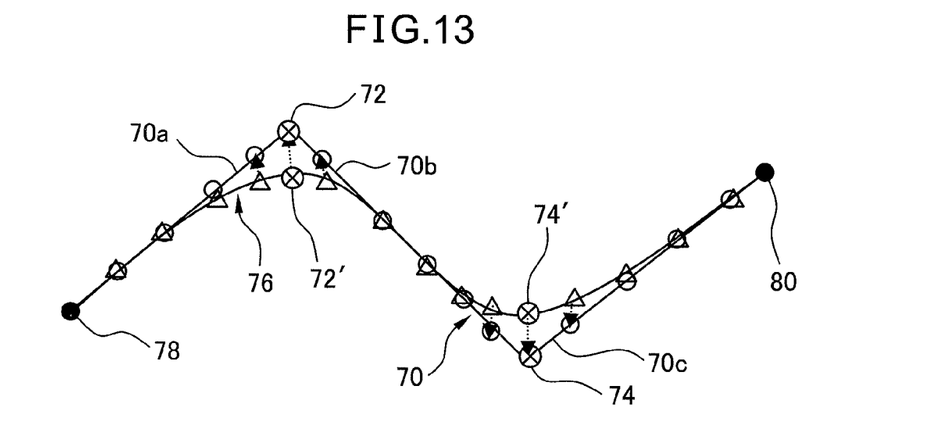
FIG. 13 is a diagram schematically showing the movement trajectories of the representative point of the tool in different two processing conditions, wherein a characteristic point is set on the movement trajectories.

FIG. 13 shows an example of the above, i.e., a reference movement trajectory (e.g., commanded trajectory) 70 including three line segments 70a, 70b and 70c connected to each other. In this case, characteristic points may be set as a connecting point 72 between line segments 70a and 70b, and a connecting point 74 between line segments 70b and 70c. For example, the characteristic point may be set as a point where a moving direction of at least one drive axis of the machine tool is reversed, or a start point (or a switching point) of each of a plurality of program block (or a program unit including at least one program line). In the example of FIG. 13, each of the movements along line segments 70a, 70b and 70c may be treated as one block.

Figure 14:
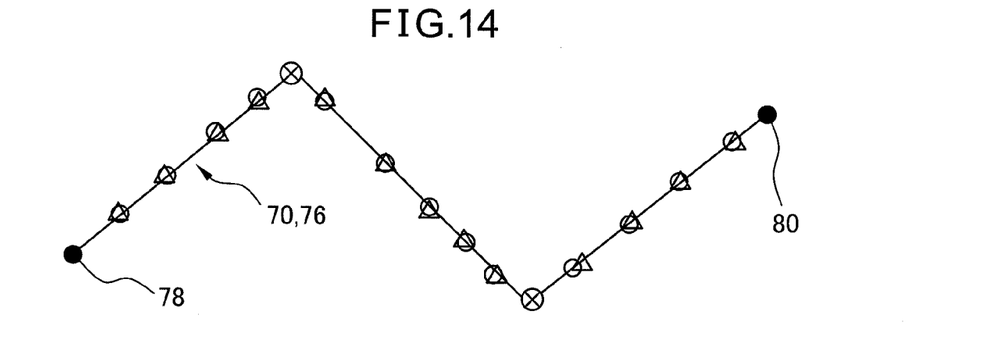
FIG. 14 is a schematic diagram wherein one of the movement trajectories is adjusted by using the movement distance of the other trajectory in the processing conditions of FIG. 13.

In relation to reference movement trajectory 70 of FIG. 13, a movement trajectory 76 is obtained by performing the different processing condition, and movement trajectory 76 is shorter than movement trajectory 70 near the characteristic point (or is curved near the characteristic point). In this case, in movement trajectory 70, the distance from start point 78 to characteristic point 72 (or the length of line segment 70a) is taken as D11, the distance between characteristic points 72 and 74 (or the length of line segment 70b) is taken as D12, and the distance from characteristic point 74 to processing terminal point 80 (or the length of line segment 70c) is taken as D13. Further, in movement trajectory 76, the distance from start point 78 to a characteristic point 72' corresponding to characteristic point 72 is taken as D21, the distance between characteristic point 72' and a characteristic point 74' corresponding to characteristic point 74 is taken as D22, and the distance from characteristic point 74' to processing terminal point 80 is taken as D23. Then, in movement trajectory 76, by multiplying the movement distance from processing start point 78 to characteristic point 72' by (D11/D21), by multiplying the movement distance from characteristic point 72' to characteristic point 74' by (D12/D22), and by multiplying the movement distance from characteristic point 74' to processing terminal point 80 by (D13/D23), the length of movement trajectory 76 is adjusted in relation to each of the three segments, as shown in FIG. 14. Therefore, the physical data in movement trajectory 76 can be compared to reference movement trajectory 70 while the processing positions of the trajectories are aligned.

Figure 15:
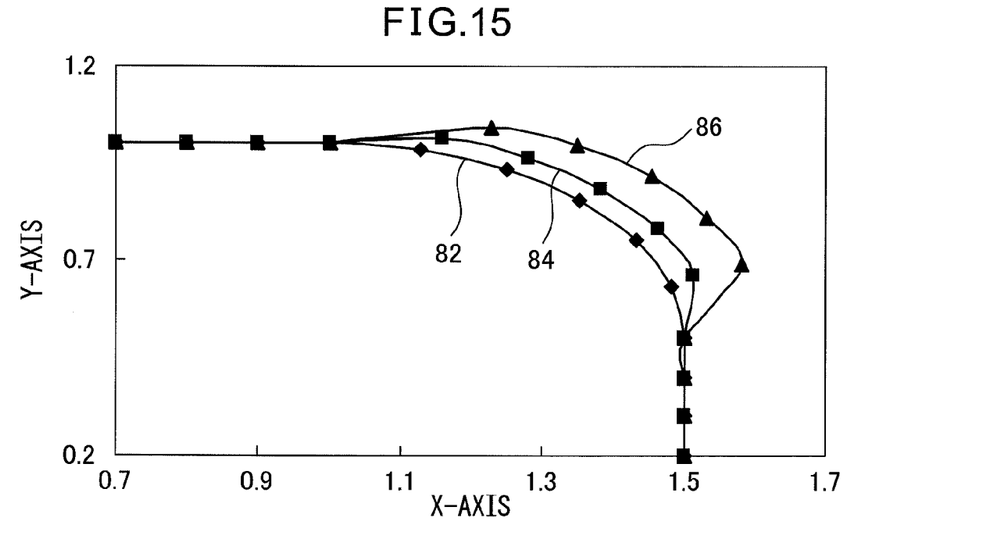
FIG. 15 is a graph showing a movement distance of the representative point of the tool along a rounded corner section, in different three processing conditions.
Figure 16:
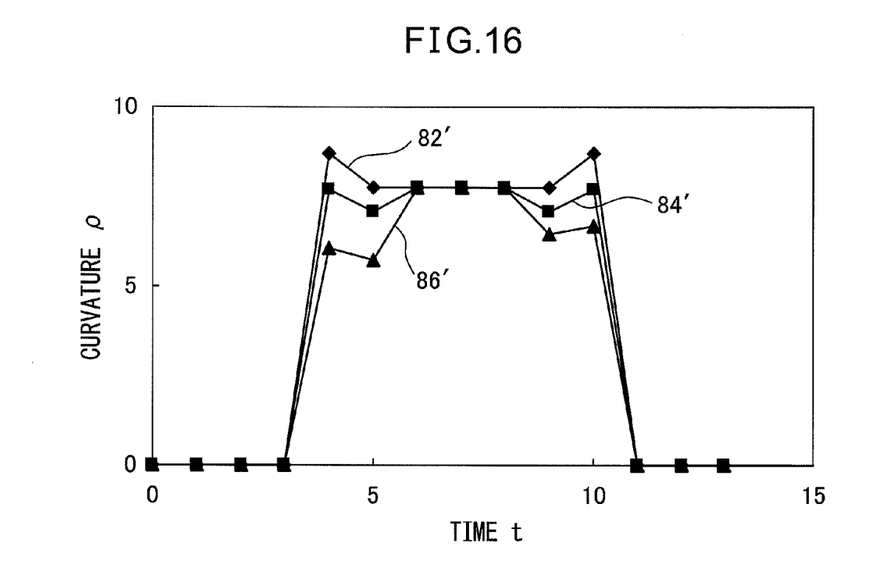
FIG. 16 is a graph showing a curvature of the corner section of FIG. 15 with reference to a time axis.

In selecting the characteristic point, a curvature may be calculated based on the trajectory of the drive axis and the tool representative point, and a point where the curvature is maximum or minimum may be determined as the characteristic point. For example, when the movement trajectory includes a rounded corner, the numerical controller automatically accelerates or decelerates the tool at the corner. Therefore, it is important to improve the accuracy of the overlapping at the corner. For example, graphs 82, 84 and 86 of FIG. 15 indicate various shapes having a corner of 90 degrees with a rounded portion (R). Further, FIG. 16 shows a calculated curvature ρ at the respective corners, concretely, the curvatures corresponding to graphs 82, 84 and 86 are indicated by graphs 82', 84' and 86', respectively. The curvature is zero at the linear section, but is maximum or minimum at the corner section. Therefore, when the movement trajectories in the different processing conditions should be compared, the accuracy of the overlapping at the corner section may be improved, by determining the characteristic point as the maximum or minimum point of the curvature or as the point where the curvatures of the trajectories are the same.

Figure 17:
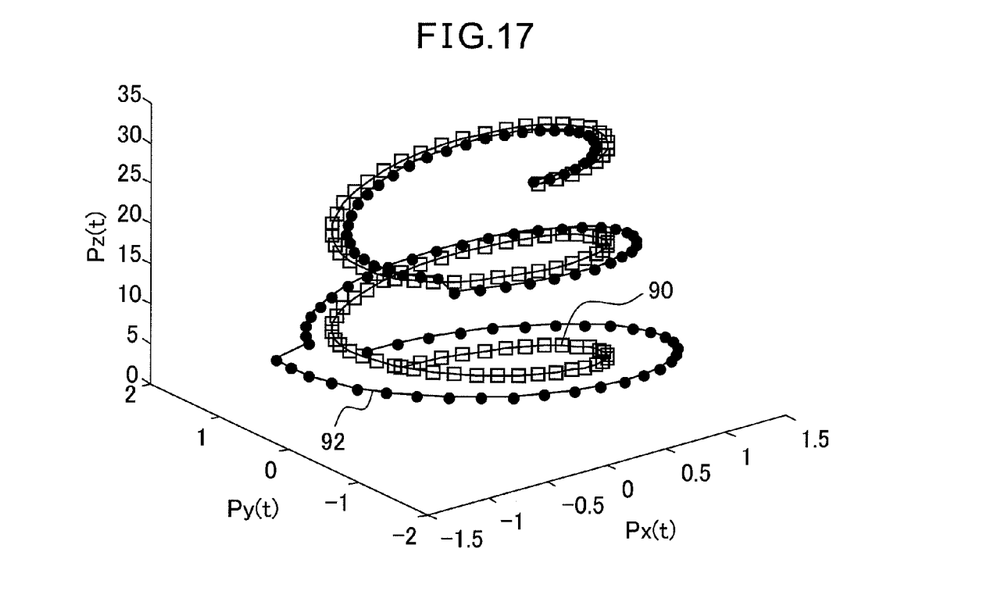
FIG. 17 is a graph showing three-dimensional movement trajectories of the representative point of the tool in different two processing conditions.
Figure 18:
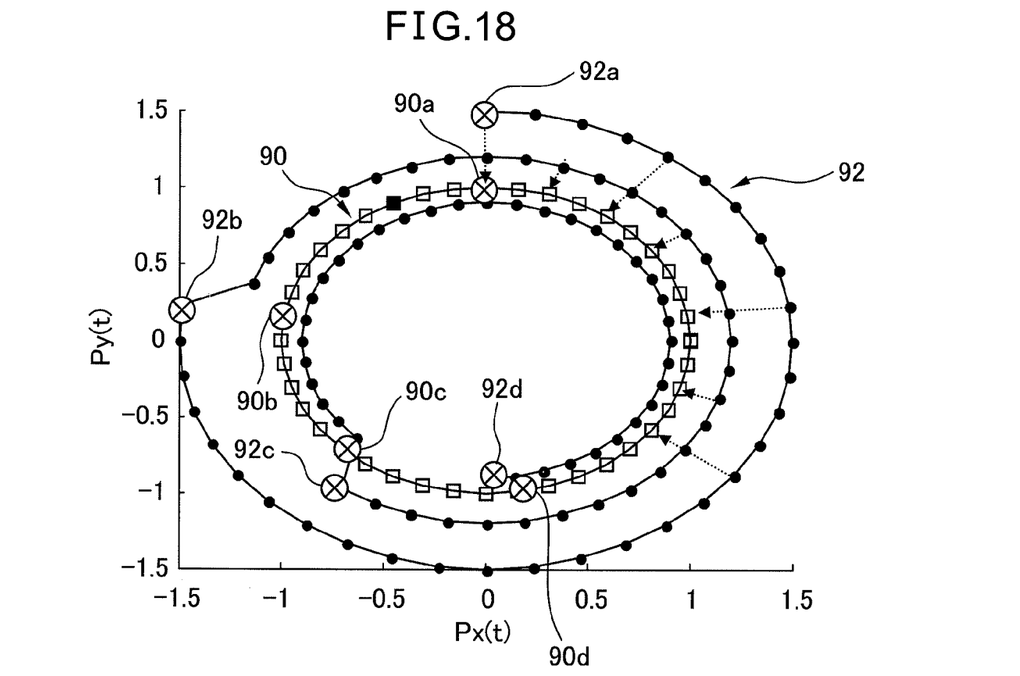
FIG. 18 is a graph wherein the movement trajectories of FIG. 17 are projected onto an X-Y plane, a processing program is divided into three blocks, and one of the trajectories of each block is adjusted by using the movement distance of the other trajectories of the corresponding block.
Figure 19:
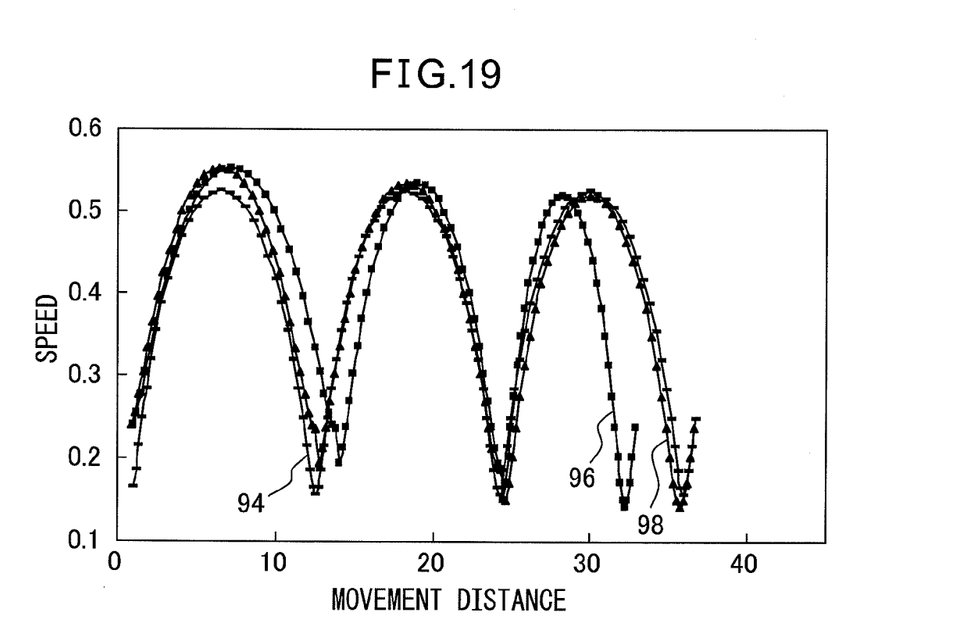
FIG. 19 is a graph wherein the moving speed of the representative point of the tool in the processing conditions of FIG. 17 is adjusted by using the movement distance and displayed on the same coordinate system.

FIGS. 17 to 19 show another example wherein the characteristic point is determined by dividing the processing program into blocks. FIG. 17 shows two movement trajectories 90 and 92 in the different processing conditions (as a result, the movement distances of the tool representative point are different), and FIG. 18 is a diagram wherein trajectories are projected onto the X-Y plane. In this case, the processing program is constituted by first, second and third blocks, and start points 90a, 90b and 90c of each block in movement trajectory 90 are selected as the characteristic points. In other words, in FIG. 18, the trajectory between each characteristic point corresponds to each processing block, and the processing terminal point is indicated by reference numeral 90d (the processing start point corresponds to 90a). on the other hand, in movement trajectory 92, characteristic points 92a, 92b and 92c correspond to characteristic points 90a, 90b and 90c of movement trajectory 90, and the processing terminal point is indicated by reference numeral 92d (the processing start point corresponds to 92a).

In this regard, the movement distances of first, second and third blocks of trajectory 90 (or the lengths of the trajectory) are taken as $D11(t)$, $D12(t)$ and $D13(t)$, respectively, and the movement distances of first, second and third blocks of trajectory 92 (or the lengths of the trajectory) are taken as $D21(t)$, $D22(t)$ and $D23(t)$, respectively. In this case, by multiplying the movement distances of the first, second and third blocks of trajectory 92 by $(D11(t)/D21(t))$, $(D12(t)/D22(t))$ and $(D13(t)/D23(t))$, respectively, each point on trajectory 92 can be represented as if each point is projected onto trajectory 90.

FIG. 19 shows a graph 94 of the distance-based speed of the tool representative point in trajectory 90, a graph 96 of the distance-based speed of the tool representative point in trajectory 92, and a graph 98 of the distance-based speed of the tool representative point in trajectory 92 after the movement distance of the tool representative point is adjusted as described above. As shown in FIG. 19, by reducing the movement distance of trajectory 92 corresponding to the movement distance of trajectory 90, trajectory 92 can be displayed and overlapped with trajectory 90 while the movement distances thereof are the same (graphs 94 and 98), whereby the comparison of the physical data at the same position becomes easier.

In addition, in the above embodiments, instead of using the position data obtained from a detector such as the encoder, information of the position command obtained from the numerical controller may be used to calculate the movement distance in each processing condition. By virtue of this, in particular in feedforward control, an error in the movement distance between the data may be minimized, whereby the data may be overlapped with each other with high accuracy.

According to the numerical controller of the present invention, the physical data before and after changing the processing condition may be displayed with reference to the movement distance of the tool representative point. Therefore, the data may be easily compared at the same processing position, and rapid and easy search for the optimum processing condition and/or adjust for various parameters may be possible.

According to the invention, when a plurality sets of data (waveforms) in the different processing conditions (such as the processing speed) should be displayed and overlapped with each other, the integrated movement distance of the drive axis and the tool representative point may be calculated from time series data relating to the position of the drive axis, and the data may be overlapped with each other based on the integrated movement distance. Therefore, the data may be compared at the same processing position, without depending on the processing speed, whereby the drive axis and/or various parameters may be properly adjusted.

By adjusting the movement distance of the movement distance-based data corresponding to the movement distance of the other (or the reference) movement distance-based data, the comparison at the same processing position can be performed more precisely.

By dividing the movement trajectory in the reference processing condition into a plurality of segments, and by adjusting the movement distance of the corresponding segments in the different processing condition corresponding to the movement distance of the segments of the reference processing condition, the comparison at the same processing position can be performed more precisely.

By dividing the movement trajectory into a plurality of segments at a point corresponding to the start point of each of a plurality of program blocks included in the processing program, the movement distance can be easily and properly adjusted.

When the movement trajectory includes a corner segment, for example, by dividing the movement trajectory into a plurality of segments at a point where the curvature of the movement trajectory is maximum or minimum, the overlapping at the corner segment and/or the comparison of the different processing conditions can be precisely performed.

By using information of the position command obtained from the numerical controller in order to calculate the movement distance in the processing condition, in particular in feedforward control, an error of the movement distance between the data can be minimized, whereby the data can be overlapped with each other with high accuracy.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A numerical controller, comprising:
a numerical controlling part which controls at least one drive axis of a machine tool;
a position data obtaining part which obtains position data of the drive axis and a representative point of a tool of the machine tool;
a physical data obtaining part which obtains physical data of the drive axis and the representative point of the tool;
a movement distance calculating part which calculates movement distance of the drive axis and the representative point of the tool based on the position data;
a data converting part which converts the physical data obtained by the physical data obtaining part, which is time axis-based data, into movement distance-based data,
  wherein the time axis-based data represent values of a parameter of one of the drive axis and the representative point of the tool over a time period, and
  wherein the movement distance-based data represent said values of said parameter over a movement distance travelled by said one of the drive axis and the representative point of the tool during said time period;
a distance-based data storing part which stores the movement distance-based data; and
a displaying part which displays the movement distance-based data,
wherein the displaying part further displays at least one past movement distance-based data in a processing condition, which is stored in the distance-based data storing part, on the movement distance-based data in a processing condition different from the processing condition of the past movement distance-based data so that the past movement distance-based data and the movement distance-based data are overlapped with each other, and
wherein the movement distance calculating part enlarges or reduces the movement distance of the movement distance-based data corresponding to a movement distance of the past movement distance-based data, and the displaying part displays the movement distance-based data based on the enlarged or reduced movement distance.

2. The numerical controller as set forth in claim 1, wherein
the movement distance calculating part divides a movement distance of the representative point of the tool in a reference processing condition into a plurality of segments, and enlarges or reduces the movement distance of a corresponding segment in a processing condition different from the reference processing condition, corresponding to the movement distance of the plurality of segments, and
the displaying part displays the movement distance-based data based on the enlarged or reduced movement distance.

3. The numerical controller as set forth in claim 2, wherein the movement distance calculating part divides the movement distance of the representative point of the tool in the reference processing condition into the plurality of segments, at a point corresponding to a start point of each block of a plurality of program blocks included in a processing program.

4. The numerical controller as set forth in claim 2, wherein the movement distance calculating part calculates a curvature of the trajectory of the drive axis and the representative point of the tool, and divides the movement distance of the representative point of the tool in the reference processing condition into the plurality of segments at a point where the curvature is maximum or minimum.

5. The numerical controller as set forth in claim 1, wherein the movement distance calculating part calculates the movement distance of the drive axis and the representative point of the tool based on information of a position command obtained from the numerical controlling part.

6. The numerical controller as set forth in claim 1, wherein
the displaying part is configured to display
a first trajectory corresponding to the past movement distance-based data, and
a second trajectory corresponding to the movement distance-based data with the enlarged or reduced movement distance, and
the displayed first trajectory corresponding to the past movement distance-based data overlaps the displayed second trajectory corresponding to the movement distance-based data with the enlarged or reduced movement distance.

7. The numerical controller as set forth in claim 1, wherein data points corresponding to the movement distance-based data are projected onto a trajectory corresponding to the past movement distance-based data.

\* \* \* \* \*